US007027526B1

(12) United States Patent
Nehoran et al.

(10) Patent No.: US 7,027,526 B1
(45) Date of Patent: Apr. 11, 2006

(54) TIME MULTIPLEXING BUS FOR DTV COMMON INTERFACE

(75) Inventors: Yoed I. Nehoran, Fremont, CA (US); Yuanping Zhao, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 727 days.

(21) Appl. No.: 10/087,111

(22) Filed: Mar. 1, 2002

(51) Int. Cl.
*H03K 9/00* (2006.01)
(52) U.S. Cl. .................................. 375/316; 725/141
(58) Field of Classification Search .............. 375/257, 375/316, 377, 295; 348/552; 725/80, 100, 725/141, 139, 151, 153, 131, 133
See application file for complete search history.

(56) References Cited

U.S. PATENT DOCUMENTS

| | | | | |
|---|---|---|---|---|
| 5,533,021 A | * | 7/1996 | Branstad et al. | 370/396 |
| 6,477,185 B1 | * | 11/2002 | Komi et al. | 370/536 |
| 6,591,419 B1 | * | 7/2003 | Barry et al. | 725/25 |
| 6,630,964 B1 | * | 10/2003 | Burns et al. | 348/554 |
| 2002/0087993 A1 | * | 7/2002 | Bergstrand | 725/80 |

OTHER PUBLICATIONS

"Digital Video Broadcasting (DVB); A guideline for the use of DVB specifications and standards", TR 101 200, Published by the European Telecommunications Standards Institute (ETSI), Sophia Antipolis, France, 1997, pp. 1-13.
"A Guideline For The Use of DVB Specifications and Standards", DVB Document A020, Published by the European Telecommunications Standards Institute (ETSI), Sophia Antipolis, France, Feb. 1997, 10 pages.
"Guidelines for Implementation and Use of the Common Interface for DVB Decoder Applications", R206-001, Published by the European Committee for Electrotechnical Standardization (CENELEC), Brussels, Belgium, 1998, pp. 1-52.
"Dual Common Interface Hardware Controller", CIMaX™ Datasheet, Published by SCM Microsystems, Fremont, CA, May 2001, pp. 1-38.
"Interfaces for CATV/SMATV Headends and Similar Professional Equipment", Published by the European Telecommunications Standards Institute (ETSI), Sophia Antipolis, France, Feb. 20, 2002, pp. 1-50.

(Continued)

*Primary Examiner*—Khanh Tran
(74) *Attorney, Agent, or Firm*—Christopher P. Maiorana, P.C.

(57) ABSTRACT

A device for use in a digital video receiver. The device generally comprising a demodulator circuit, a decoder circuit, a plurality of bi-directional buffers, and a circuit. The demodulator circuit may be configured to generate (i) a first clock signal compliant with a standard interface for the digital video receiver and (ii) a first plurality of data signals compliant with the standard interface. The decoder circuit may be configured to receive a second plurality of data signals compliant with the standard interface. The plurality of first bi-directional buffers may be configured to multiplex the first data signals with the second data signals at a plurality of data interfaces in response to the first clock signal. The circuit may be configured to generate a direction signal at a direction interface in response to the first clock signal to indicate a direction of the data interfaces.

17 Claims, 5 Drawing Sheets

OTHER PUBLICATIONS

"Common Interface Specification For Conditional Access and Other Digital Video Broadcasting Decoder Applications", Published by the European Telecommunications Standards Institute (ETSI), Sophia Antipolis, France, May 1996, pp. 1-91.

"Common Interface Specification for Conditional Access and other Digital Video Broadcasting Decoder Applications", Published by the European Committee for Electrotechnical Standardization (CENELEC), Brussels, Belgium, Feb. 1997, pp. 1-86.

* cited by examiner

US 7,027,526 B1

TIME MULTIPLEXING BUS FOR DTV COMMON INTERFACE

FIELD OF THE INVENTION

The present invention relates to a method and/or architecture for implementing set-top-boxes (STBs) generally and, more particularly, to a method and/or architecture for implementing a demodulator/decoder device.

BACKGROUND OF THE INVENTION

A common interface (CI) standard is commonly used in digital television (DTV) or digital video broadcast (DVB) set-top-box (STB) designs. The CI standard was created out of a need to implement a conditional access for a transport stream between a receiving channel and a source decoder on a module external to the source decoder. The conditional access allows DVB-based services to be "pay" type services or include at least some elements that are not freely available to the public at large. The CI standard supports insertion of one or more PC Card modules into the transport stream for descrambling a scrambled signal.

Referring to FIG. 1, a block diagram of a conventional STB 30 is shown. The STB 30 has a host circuit 32 including a tuner 34, a channel demodulator 36 and a source decoder 38 for converting a DVB carrier signal (i.e., RF) into a baseband signal (i.e., BBS). A PC Card module 40 can be incorporated into the STB 30 to provide a descrambling function in a descrambler circuit 41. Security codes and/or keys may be stored in a Smart Card 42 inserted into the PC Card module 40.

A scrambled transport stream (i.e., TS1) is provided from the host circuit 32 through an interface circuit 43 to the module 40 to transfer scrambled data. A descrambled transport stream (i.e., TS2) is provided from the module 40 through the interface circuit 43 to the host circuit 32 to transfer descrambled data. The CI standard defines interfaces for the transport streams TS1 and TS2 and also a command interface (i.e., CMD) between a microprocessor 44 in the host circuit 32 and another microprocessor, programmable logic, memory or logic circuit 46 in the PC Card module 40.

The CI standard defines an 8-bit wide parallel data signal. In the STB 30, eleven (11) or twelve (12) wires are conventionally used to implement each transport stream. At least 22 pins are required by the CI standard for communication where the host circuit 32 integrates the demodulator functionality and the source decoder functionality. The host circuit 32 requires eleven (11) pins for the outgoing scrambled transport stream TS1 and eleven (11) more pins for the incoming descrambled transport stream TS2. Up to two (2) additional pins are used if the host circuit 32 presents and/or receives external error signals (not shown) as part of the transport streams TS1 and TS2. When the demodulator and the source decoder functionality are implemented in a single integrated circuit package (as indicated by a dotted box 48), the 22 to 24-pin requirement to support the transport streams TS1 and TS2 can be a limitation for the integrated circuit package 48.

SUMMARY OF THE INVENTION

The present invention concerns a device for use in a digital video receiver. The device generally comprises a demodulator circuit, a decoder circuit, a plurality of bidirectional buffers, and a circuit. The demodulator circuit may be configured to generate (i) a first clock signal compliant with a standard interface for the digital video receiver and (ii) a first plurality of data signals compliant with the standard interface. The decoder circuit may be configured to receive a second plurality of data signals compliant with the standard interface. The plurality of first bidirectional buffers may be configured to multiplex the first data signals with the second data signals at a plurality of data interfaces in response to the first clock signal. The circuit may be configured to generate a direction signal at a direction interface in response to the first clock signal to indicate a direction of the data interfaces.

The objects, features and advantages of the present invention include providing a demodulator/decoder device that may provide (i) support for multiple transport streams, (ii) multiplexing of the transport streams, (iii) fewer pins than a conventional Common Interface implementation, (iv) reduced fabrication costs, (v) reduced space claims for an electronic circuit, (vi) lower printed circuit board densities, (vii) a smaller printed circuit board size, (viii) easier printed circuit board design, and/or (ix) lower printed circuit board fabrication costs.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
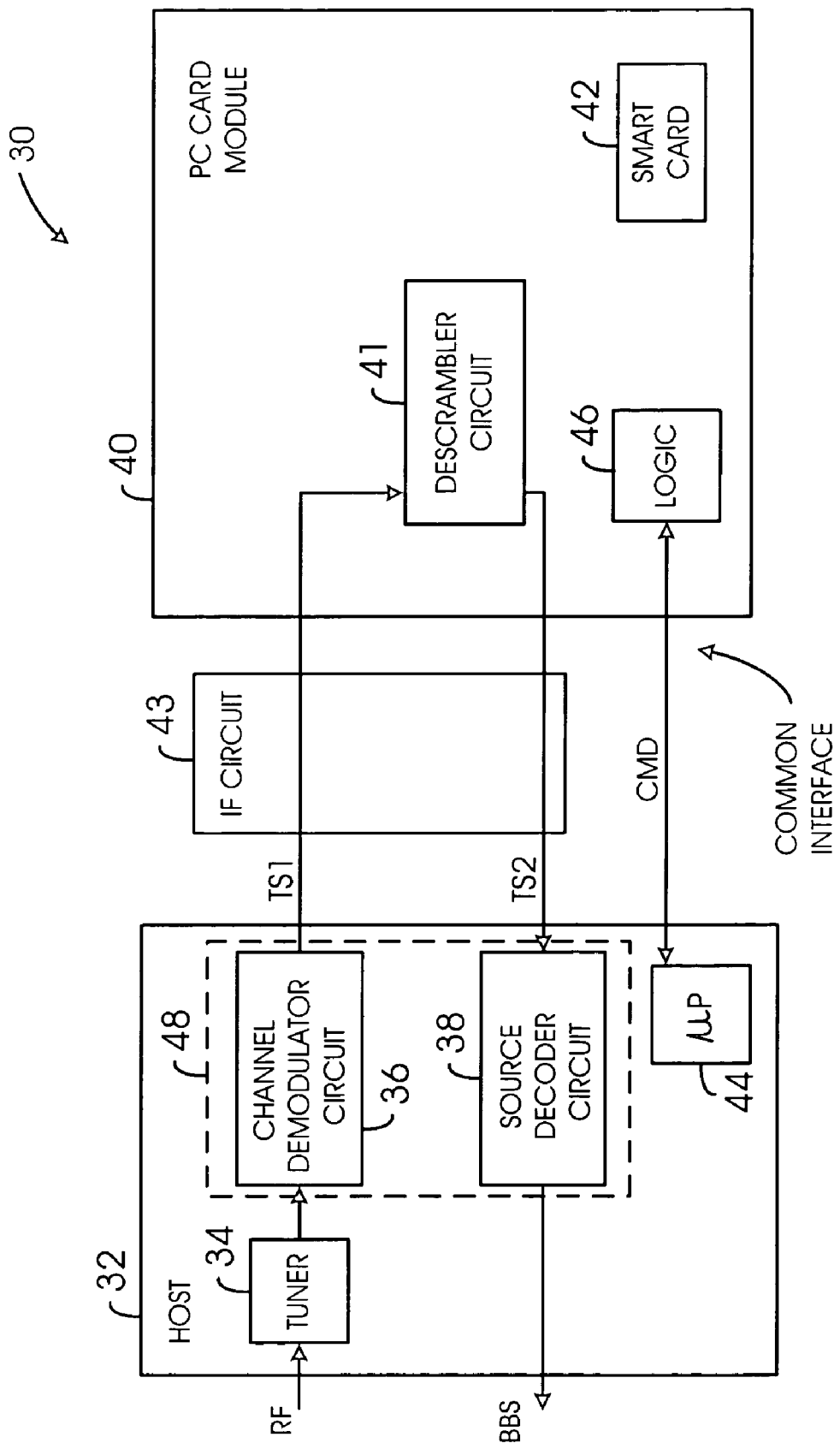
FIG. 1 is a block diagram of a conventional set-top-box.
Figure 2:
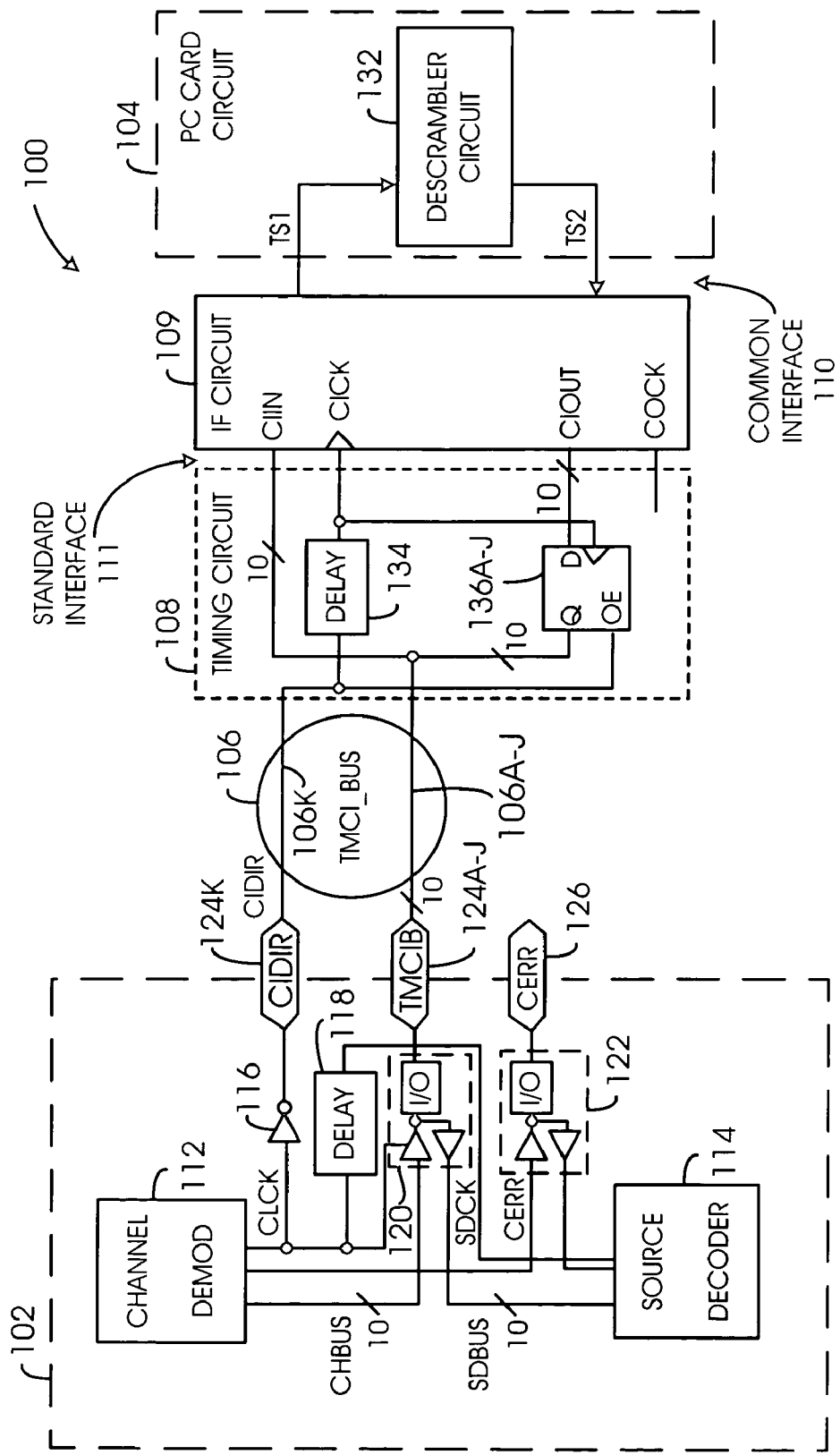
FIG. 2 is a block diagram of a preferred embodiment of the present invention.

Referring to FIG. 2, a block diagram of a portion of an apparatus 100 is shown in accordance with a preferred embodiment of the present invention. The apparatus 100 may be implemented as a set-top-box (STB), a digital television (DTV) receiver, a digital video broadcast (DVB) receiver, or a digital video receiver. The apparatus 100 generally comprises a circuit 102 and a circuit 104 coupled through a bus 106, a circuit 108 and a circuit 109. The circuit 102 may be implemented as a digital video circuit or device. The circuit 104 may be implemented as a descrambler circuit. The bus 106 may be implemented as a time multiplexing common interface (TMCI) bus. The circuit 108 may be implemented as a timing circuit that alters timing of signals. The circuit 109 may be implemented as a common interface circuit or controller.

The descrambler circuit 104 may be compliant with a "PC Card Standard", published by the Personal Computer Memory Card International Association, Sunnyvale, Calif., February 1995. The descrambler circuit 104 may be compliant with other standards to meet the design criteria of a particular application. Other functions may be implemented by the circuit 104 to meet the design criterial of a particular application.

A standard interface 110 may be provided between the descrambler circuit 104 and the interface circuit 109. The standard interface 110 generally defines multiple transport streams to and from the descrambler circuit 104. The standard interface 110 may be compliant with a Common Interface (CI) standard. The CI standard may be defined in "Common Interface Standard for Conditional Access and other Digital Video Broadcasting Decoder Applications", European Standard EN 50221, published by the European Committee for Electrotechnical Standardization (CENELEC), Brussels, Belgium, February 1997. The CI standard interface may also be defined in "Common Interface Specification for Conditional Access and other Digital Video Broadcasting Decoder Applications", Digital Video Broadcast (DVB) document A017, published by the European Telecommunications Standards Institute (ETSI), Sophia Antipolis, France, May 1996. The European Standard EN 50221 and the DVB document A017 are hereby incorporated by reference in their entirety.

An input transport stream (e.g., TS1) received at the standard or common interface 110 generally comprises a clock signal and a set of input signals. The input signals generally comprise multiple data signals and multiple control signals. The control signals generally comprise a valid signal and a synchronization signal. The input transport stream TS1 may flow from the interface circuit 109 to the descrambler circuit 104. The clock signal, each data signal, and each control signal within the input transport stream TS1 may be on an individual interface or pin at the common interface 110.

An output transport stream (e.g., TS2) through the common interface 110 generally comprises a clock signal and a set of output signals. The output signals generally comprise multiple data signals and multiple control signals. The control signals generally comprise a valid signal and a synchronization signal. The clock signal, each data signal, and each control signal within the output transport stream TS2 may be on an individual interface or pin at the common interface 110.

Another standard interface 111 may be provided between the timing circuit 108 and the interface circuit 109. The standard interface 111 generally defines multiple transport streams to and from the interface circuit 109. The standard interface 111 may be compliant with a synchronous parallel interface (SPI) standard. The SPI standard may be defined in "Interfaces for CATV/SMATV Headends and Similar Processional Equipment", DVB-PI-232 Revised, Digital Video Broadcast (DVB) document TM1449 Rev.2, published by the European Telecommunications Standards Institute (ETSI), Sophia Antipolis, France. The DVB document TM1449 Rev. 2 is hereby incorporated by reference in its entirety. The standard interface 111 may also be defined as part of the CI standard interface per the European Standard EN 50221 and/or the DVB document A017.

A standard input transport stream received at the standard interface 111 from the timing circuit 108 generally comprises an input clock signal (e.g., CICK) and a set of input signals (e.g., CIIN). The input signals CIIN generally comprise multiple data signals and multiple control signals. The control signals generally comprise a valid signal and a synchronization signal. The standard input transport stream may flow from the timing circuit 108 to the interface circuit 109. The clock signal CICK, each data signal, and each control signal within the standard input transport stream may be on an individual interface or pin at the standard interface 111. The interface circuit 109 may route the standard input transport stream to the descrambler circuit 104 as the input transport stream TS1.

A standard output transport stream through the standard interface 111 generally comprises an output clock signal (e.g., COCK) and an output set of signals (e.g., CIOUT). The signals CIOUT generally comprise multiple data signals and multiple control signals. The control signals generally comprise a valid signal and a synchronization signal. The clock signal COCK, each data signal, and each control signal within the standard output transport stream may be on an individual interface or pin at the standard interface 111. The interface circuit 109 may route the output transport stream TS2 from the descrambler circuit 104 as the standard output transport stream.

A signal (e.g., CIDIR) may be transferred by the TMCI bus 106 from the digital video circuit 102 to the timing circuit 108. A set of signals (e.g., TMCIB) may be transferred by the TMCI bus 106 between the digital video circuit 102 and the timing circuit 108. The set of signals TMCIB generally comprises multiple data signals (e.g., CDATA[7:0]) and multiple control signals. The control signals generally comprise a valid signal (e.g., CVALID) and a synchronization signal (e.g., CSYNC).

The TMCI bus 106 generally comprises eleven (11) lines. Eight (8) lines 106A–H may carry the bidirectional data signals CDATA[7:0]. A line 106I may carry the bidirectional signal CVALID. A line 106J may carry the bidirectional signal CSYNC. A line 106K may carry the non-multiplexed, dedicated direction control signal CIDIR. The eleven (11) lines 106A–J may be used to implement two 11-bit transport streams generally resulting in a savings of up to eleven (11) lines and interfaces required for the digital video circuit 102.

The signals TMCIB may be time multiplexed on the lines 106A–J. The direction control signal CIDIR may control the time multiplexing of the signals TMCIB. While the direction control signal CIDIR is in a first direction state the signals TMCIB may flow from the digital video circuit 102 to the timing circuit 108. While the direction control signal CIDIR is in a second direction state the signals TMCIB may flow from the timing circuit 108 to the digital video circuit 102.

The digital video circuit 102 generally comprises a channel demodulation circuit 112, a source decoder circuit 114, an inverting buffer circuit 116, a delay circuit 118, multiple bidirectional buffer circuits 120, and another bidirectional buffer circuit 122. A bus (e.g., CHBUS) may transfer data and control signals from the channel demodulator circuit 112 to the bidirectional buffers 120. Another bus (e.g., SDBUS) may transfer additional data and control signals from the bidirectional buffers 120 to the source decoder circuit 114.

A scrambled transport stream may be generated by the channel demodulation circuit 112. The scrambled transport stream generally comprises a clock signal (e.g., CCLK), multiple data signals, a valid signal, a synchronization signal and an error flag signal. The scrambled transport stream may be compliant with the CI standard and/or the SPI standard. A rising edge of the clock signal CCLK generally indicates that the data signals have stabilized and thus are ready to be read. The valid signal may be asserted to indicate that the data signals are valid. The synchronization signal may be asserted during a first byte of each transport packet for the data signals to provide synchronization to a start of each transport packet.

The clock signal CCLK may be presented by the channel demodulator circuit 112 to the inverting buffer circuit 116. The inverting buffer circuit 116 may generate the direction control signal CIDIR by inverting the clock signal CCLK. The direction control signal CIDIR may thus function to control directional flow of data and as a timing signal for clock signal(s). The direction control signal CIDIR may be presented through an interface 124k to the line 106K.

The delay circuit 118 may delay the clock signal CCLK to generate another clock signal (e.g., SDCK). The clock signal SDCK may have a fixed timing relationship with the clock signal CCLK due to the delay circuit 118. A delay or phase shift of the clock signal CCLK introduced by the delay circuit 118 may be approximately 270 degrees. Other phase shifts or delays may be implemented to meet the design criteria of a particular application.

The data signals, valid signal and synchronization signal of the scrambled transport stream may be transferred to the bidirectional buffer circuits 120 through the bus CHBUS. The bidirectional buffers 120 may drive the data signals, the valid signal and the synchronization signal of the scrambled transport stream onto the lines 106A–J through multiple interfaces 124A–J while the direction control signal CIDIR is in a transmit state (e.g., a logical HIGH state). The bidirectional buffer circuits 120 may present a high-impedance to the interfaces 124A–J and the lines 106A–J while the direction control signal CIDIR is in a receive state (e.g., a logical LOW state).

A signal (e.g., CERR) may be generated by the channel demodulation circuit 112. The signal CERR may be implemented as an error signal. Generally, the descrambler circuit 104 does not require the signal CERR. Therefore, the signal CERR may be kept inside the digital video circuit 102 on a direct link (not shown) between the channel demodulator circuit 112 and the source decoder circuit 114. In some applications, however, a user may need to use the signal CERR or may want to present the signal CERR to the source decoder circuit 114 from external to the digital video circuit 102. As a result, the signal CERR may be presented at an interface 126 and simultaneously presented to the source decoder circuit 114 by the bidirectional buffer circuit 122.

A descrambled transport stream may be received by the source decoder circuit 114. The descrambled transport stream generally comprises a clock signal (e.g., SDCK), multiple data signals, a valid signal and a synchronization signal. The descrambled transport stream may be compliant with the CI standard and/or SPI standard. A rising edge of the clock signal SDCK generally indicates that the data signals have stabilized and thus are ready to be read. The valid signal may be asserted to indicate that the data signals are valid. The synchronization signal may be asserted during a first byte of each transport packet for the data signals to provide synchronization to a start of each transport packet.

The data signals, the valid signal and the synchronization signal of the descrambled transport stream may be transferred to the source decoder circuit 114 through the bus SDBUS. The bidirectional buffers 120 may receive the data signal, the valid signal and the synchronization signal of the descrambled transport stream from the lines 106A–J while the direction control signal CIDIR is in the receive state. The bidirectional buffer circuits 120 may bypass the data signals, the valid signal and the synchronization signal of the descrambled transport stream from the bus CHBUS to the bus SDBUS directly while the direction control signal CIDIR is in the transmit state.

An operation of the bidirectional buffers 120 may be to time multiplex the data signals, the valid signal and the synchronization signal of the scrambled transport stream with the similar signals of the descrambled transport stream at the interfaces 124A–J. The time multiplexing may be controlled by the direction control signal CIDIR. The direction control signal CIDIR may be non-multiplexed at the interface 124K.

The interface circuit 109 may provide the common interface 110 to the descrambler circuit 104. The interface circuit 109 may provide the standard interface 111 to the timing circuit 108. An example implementation of the interface circuit 109 may be the CIMaX™ Dual Common Interface Hardware Controller available from SCM Microsystems, Fremont, Calif.

The interface circuit 109 may receive the scrambled transport stream from the timing circuit 108 as the standard input transport stream. The interface circuit 109 generally presents the standard input transport stream as the input transport stream TS1 to the descrambler circuit 104. A descrambler module 132 within the descrambler circuit 104 may descramble the input transport stream to generate the output transport stream. The interface circuit 109 then generally presents the output transport stream to the timing circuit 108 as the standard output transport stream.

The timing circuit 108 generally comprises a delay circuit 134 and multiple registers 136A–J. The delay circuit 134 may be configured to generate the clock signal CICK from the direction control signal CIDIR. The clock signal CICK may have a fixed timing relationship with the direction control signal CIDIR due to the delay circuit 134. A delay or phase shift of the clock signal CICK relative to the direction control signal CIDIR introduced by the delay circuit 134 may be approximately 90 degrees. Other phase shifts or delays may be implemented to meet the design criteria of a particular application. A rising edge of the clock signal CICK may indicate that the signals from the TMCI bus 106 are ready to be read by the interface circuit 109 through CIIN pins.

Within the interface circuit 109, buffers (not shown) for the signals CIOUT generally do not have a tri-state or high-impedance capability and thus the signals CIOUT may need to be reconditioned to be compatible with the TMCI bus 106. The registers 136 with an output enable functionality may be used to drive the signals CIOUT onto the TMCI bus 106. The registers 136 may be implemented as D-type registers with output enable (OE).

A D-input of each register 136A–J may receive one of the signals CIOUT. A Q-output of each register 136A–J may present a signal to the TMCI bus 106 on one of the lines 106A–J. A clock input for each register 136 may receive the clock signal CICK. The rising edge of the clock signal CICK may cause the registers 136 to read and store the signals CIOUT.

An output enable (OE) interface of each register 136A–J may be coupled to the line 106K to receive the direction control signal CIDIR. While the direction control signal CIDIR is in the transmit state (the logical HIGH state) the registers 136 may present a high impedance at the Q-outputs to the TMCI bus 106.

Therefore, the bidirectional buffers 120 may drive the lines 106A–J to transfer the data signals and the control signals of the scrambled transport stream from the digital video circuit 102 to the interface circuit 109. While the direction control signal CIDIR is in the receive state (the logical LOW state) the Q-outputs of the registers 136 are generally active. Therefore, the registers 136 may drive the lines 106A–J to transfer the data signals and the control signals of the descrambled transport stream from the interface circuit 109 to the digital video circuit 102.

In one embodiment of the apparatus 100, the timing circuit 108 may be implemented as glue logic on a printed circuit board to adapt the TMCI bus 106 to an existing interface circuit 109 having the standard interface 111. In other embodiments, the delay circuit 134 and/or registers 136 may be implemented within the interface circuit 109 to provide a clean connection to the TMCI bus 106.

Figure 3:
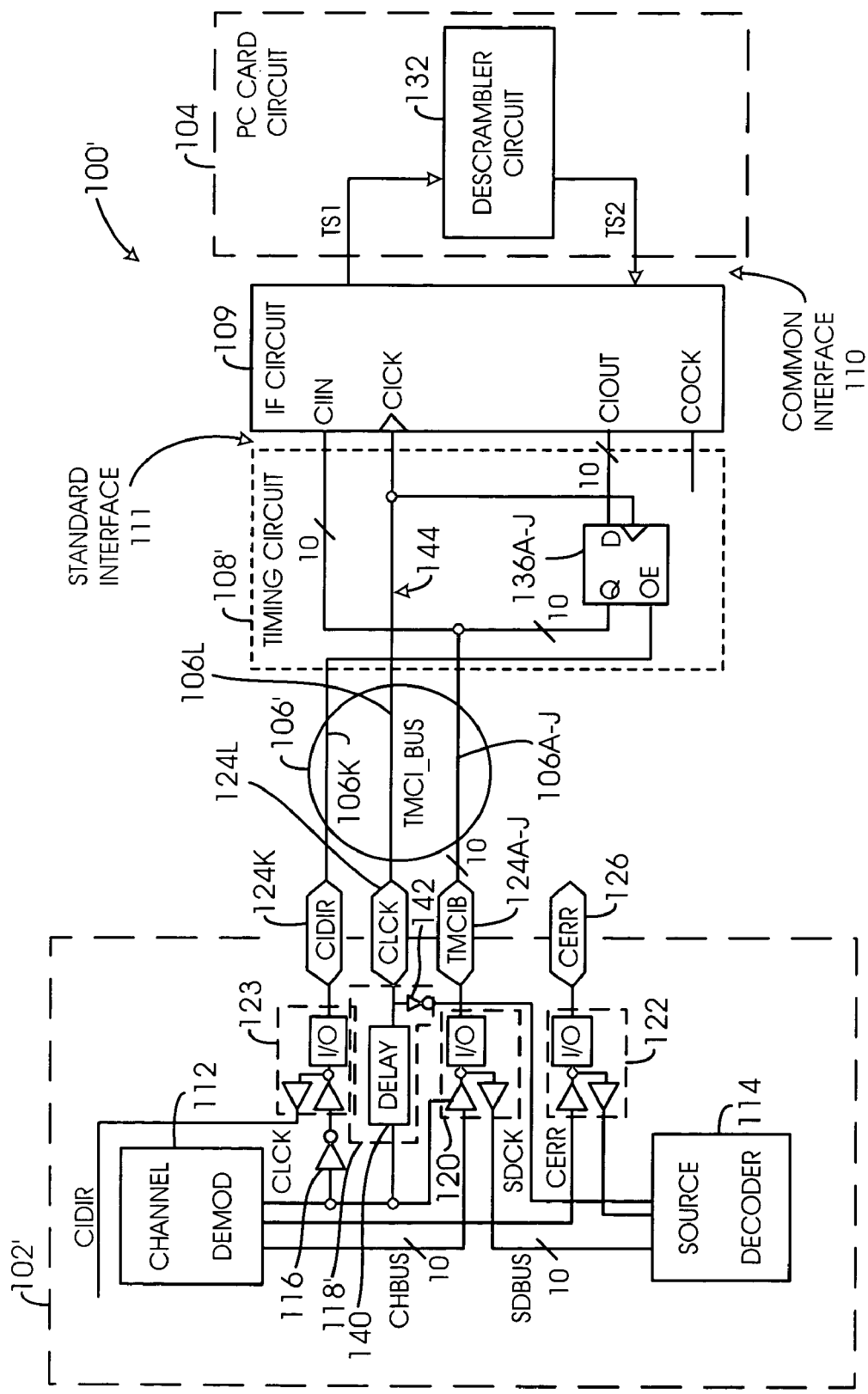
FIG. 3 is a block diagram of another preferred embodiment of the present invention.

Referring to FIG. 3, a block diagram of another embodiment for a portion of an apparatus 100' is shown. The apparatus 100' generally comprises a digital video circuit 102' and the descrambler circuit 104 coupled by a TMCI bus 106', a timing circuit 108' and the interface circuit 109. The apparatus 100' shown in FIG. 3 may vary from the apparatus 100 shown in FIG. 2 mainly due to the clock signal CICK being generated by the digital video circuit 102' (FIG. 3) instead of by the timing circuit 108 (FIG. 2). As a result, the TMCI bus 106' shown in FIG. 3 may have an additional line 106L to transfer the clock signal CICK from the digital video circuit 102' to the descrambler circuit 104.

The digital video circuit 102' generally comprises the channel demodulator circuit 112, the source decoder circuit 114, the inverting buffer circuit 116, a circuit 118', the bidirectional buffers 120, the bidirectional buffer circuit 122, a bidirectional buffer circuit 123, the interfaces 124A–K, and an interface 124L. The bidirectional buffer circuit 123 may be provided between the inverting buffer circuit 116 and the interface 124K to provide a bidirectional capability for the direction control signal CIDIR. Using the bidirectional buffer circuit 123, the direction control signal CIDIR may also be used as an auxiliary direction control signal for the digital video circuit 102'.

The circuit 118' may comprise a delay circuit 140 and an inverter 142. The delay circuit 140 may be configured to generate the clock signal CICK from the clock signal CCLK. The clock signal CICK may be presented at the interface 124L to the TMCI bus 106'. The clock signal CICK may have a fixed timing relationship with the clock signal CCLK due to the delay circuit 140. A delay or phase shift in the clock signal CICK relative to the clock signal CCLK may be approximately 90 degrees. Other phase shifts or delays may be implemented to meet the design criteria of a particular application.

The circuit 118' may also generate and present the clock signal SDCK. The inverter 142 may invert the clock signal CICK to generate the clock signal SDCK. Therefore, the clock signal SDCK may have a delay or a phase shift relative to the clock signal CICK of approximately 180 degrees. Likewise, the clock signal SDCK may have another delay or another phase shift relative to the clock signal CCLK of approximately 270 degrees, The timing circuit 108' generally comprises the registers 136A–J and a line 144. The line 144 may transfer the clock signal CICK from the line 106L to the descrambler circuit 104. The clock inputs of the registers 136 may be coupled to the line 144 to receive the clock signal CICK.

The interface 123 of the digital video circuit 102' may result in a twelve (12) line implementation for the TMCI bus 106'. In comparison, the 12-line TMCI bus 106' may require up to half of the lines required by the conventional 22 or 24-pin standard interface 111 to carry two transport streams. Accounting for the interface 126 for the signal CERR still results in a ten (10) interface savings as compared with the conventional 22-pin standard interface 111.

The CI standard defines relatively low data rates as compared with modern digital logic switching rates. The parallel data signals within the input and the output transport streams may also have a relatively low rate. For example, a conventional interface circuit 109 may have a maximum data rate of 9 million bits per second (Mbps). The digital video circuits 102 and 102' may support parallel transport stream data rates up to 13 Mbps. The apparatus 100/100' containing the TMCI bus 106/106' may operate at a basic system clock rate of approximately 27 MHz. Other system clock rates may be implemented to meet the design criteria of a particular application.

Figure 4:
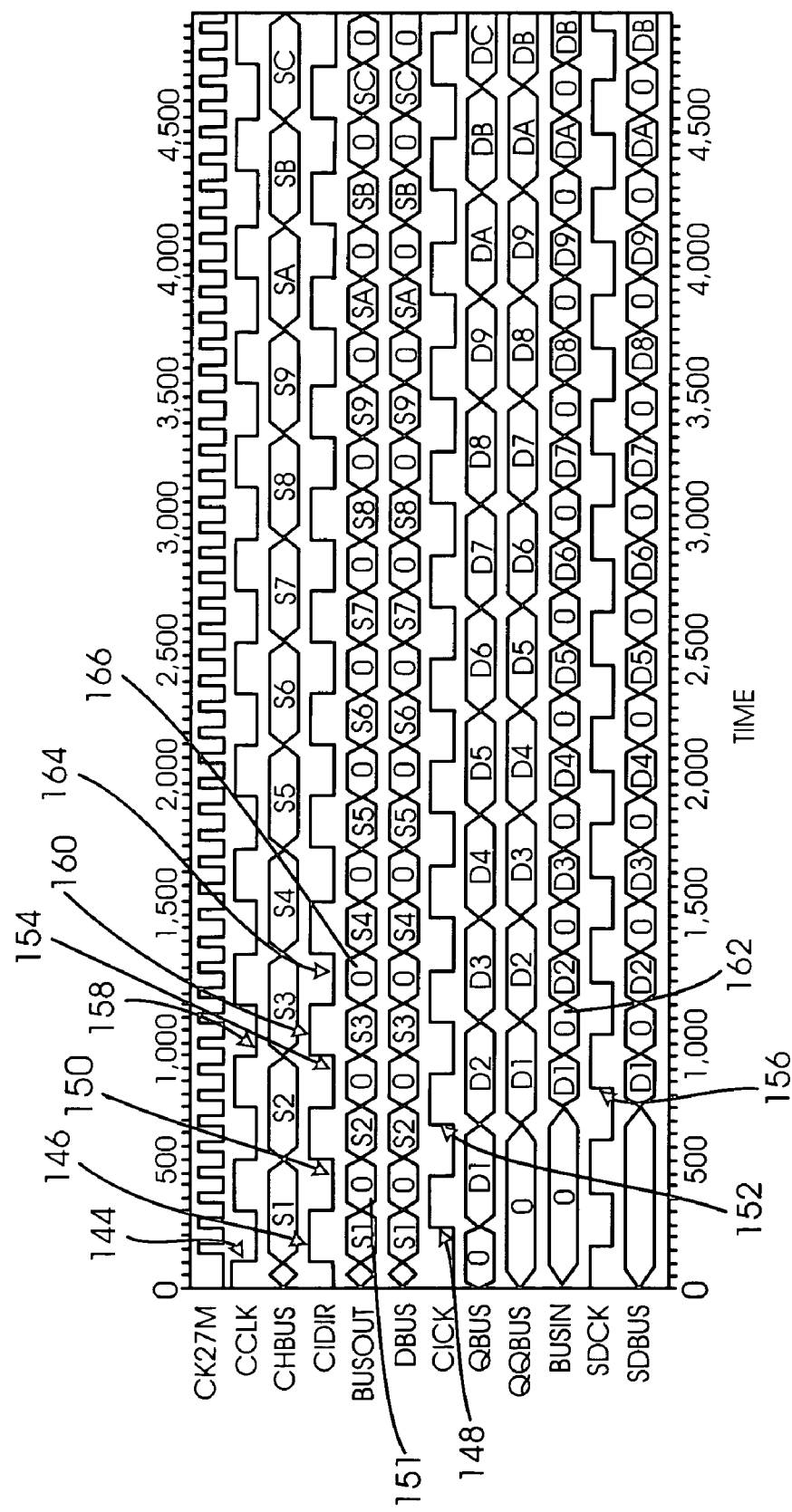
FIG. 4 is a timing diagram illustrating a functional simulation of the present invention.

Referring to FIG. 4, a timing diagram of a functional simulation of the TMCI bus 106 is shown. The functional simulation may model the TMCI bus 106 as having only four (4) of the data signals (e.g., lines 106A–D and 106J–K). A cycle of the clock signal CCLK may comprise four (4) cycles of a system clock signal (e.g., CK27M). Two signals (e.g., BUSOUT and BUSIN) may be used to present two functions of the bidirectional TMCI bus 106. The signal BUSOUT generally represents values of the data signals presented by the digital video circuit 102 to the TMCI bus 106. The signal BUSIN generally represents values of the data signals presented by the interface circuit 109 to the TMCI bus 106. A zero value "0" on the signals BUSOUT and BUSIN may represent an invalid signal or a high-impedance presented to the TMCI bus 106. A one cycle operational delay for the descrambler circuit 104 to descramble the scrambled transport stream may be modeled as a D-type register delay. Definitions for the signals shown in FIG. 4 may be as follows:

CK27M—the system clock signal.
CCLK—the scrambled transport stream clock signal generated by the channel demodulator circuit 112.
CHBUS—values (e.g., Sx, x=1, 2, 3, . . . n) of the scrambled transport stream data signals on the bus CHBUS.
CIDIR—the direction control signal.
BUSOUT—the values Sx transmitted by the digital video circuit 102.
DBUS—the values Sx received by the interface circuit 109.
CICK—the scrambled transport stream clock signal received by the interface circuit 109.
QBUS—values (e.g., Dx, x=1, 2, 3, . . . n) of the descrambled transport stream data signals transmitted by the interface circuit 109.
QQBUS—the values Dx stored by the registers 136.
BUSIN—the values Dx transmitted by the registers 136 and received by the digital video circuit 102.
SDCK—the descrambled transport stream clock signal received by the source decoder circuit 114.
SDBUS—the values Dx on the bus SDBUS and received by the source decoder circuit 114.

Transfer of the scrambled data signals generated by the channel demodulator circuit 102 to the interface circuit 109 may follow a sequence of steps as described below. A falling edge 144 of the clock signal CCLK may indicate that a scrambled value S1 on the bus CHBUS is ready to be transferred to the interface circuit 109. While direction control signal CIDIR in the logical HIGH state 146 the bidirectional buffers 120 may drive the value S1 onto the TMCI bus 106 (BUSOUT=S1). The TMCI bus 106 may transfer the value S1 to the interface circuit 109 (DBUS=S1). A rising edge 148 of the clock signal CICK may cause the interface circuit 109 to read the value S1. While the direction control signal CIDIR is in the logical LOW state 150 the bidirectional buffers 120 may present a high impedance to the TMCI bus 106 (BUSOUT=0 as indicated by reference number 151).

Transfer of the descrambled data signals generated by the descrambler module 132 to the source decoder circuit 114 may follow a sequence of steps as described below. The descrambler module 132 may generate a descrambled value D1 a delay after the rising edge 148 of the clock signal CICK. The interface circuit 109 may then present the value D1 to the registers 136 (QBUS=D1). A next rising edge 152 of the clock signal CICK may cause the registers 136 to read and store the value D1 (QQBUS=D1). While the direction control signal CIDIR is in the logical LOW state 154, the registers 136 may drive (output enabled) the value D1 onto the TMCI bus 106 (BUSIN=D1). The TMCI bus 106 may transfer the value D1 to the bidirectional buffers 120. The bidirectional buffers 120 may drive the value D1 onto the bus SDBUS (SDBUS=D1). A rising edge 156 of the clock signal SDCK may cause the source decoder circuit 114 to read the value D1 from the SDBUS. During a subsequent logical LOW state 158 of the clock signal CCLK, the inverting buffer circuit 116 may drive the direction control signal CIDIR to the logical HIGH state 160. The direction control signal CIDIR in the logical HIGH state 160 may cause the registers 136 to present a high impedance to the TMCI bus 106 (BUSIN=0 as indicated by reference number 162).

The TMCI bus 106 may operate as a time multiplexed bus by alternating transfer of the scrambled transport stream and the descrambled transport stream. For example, while the registers 136 are presenting the high impedance 162 to the TMCI bus 106 the bidirectional buffers 120 may be driving a scrambled value S3 onto the TMCI bus 106. During a next low half cycle 164 of the direction control signal CIDIR, the bidirectional buffers 120 may present a high impedance to the TMCI bus 106 (BUSOUT=0 indicated by reference number 166). While the bidirectional buffers 120 are presenting the high impedance 166, the registers 136 may be driving a descrambled value D2 onto the TMCI bus 106 (BUSIN=D2). The alternating between the scrambled transport stream and the descrambled transport stream may then repeat as necessary.

Figure 5:
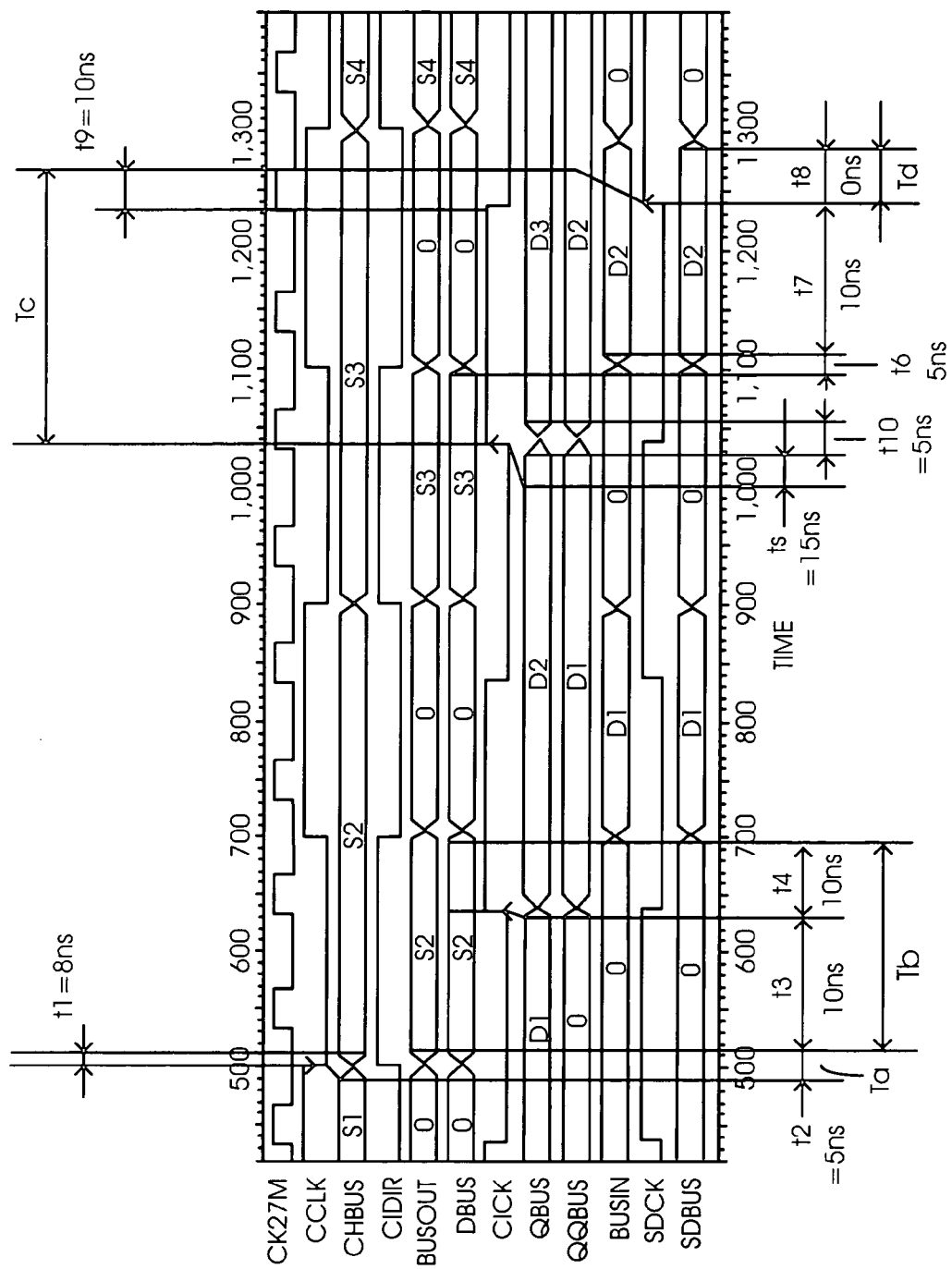
FIG. 5 is a diagram of a timing analysis of the functional simulation.

Referring to FIG. 5, a diagram of a timing analysis of the functional simulation is shown. The timing analysis is generally based on a full cycle of signal flow from the function simulation shown in FIG. 4. During the timing analysis, the TMCI bus switch over time may be assumed to be 5 nanoseconds (ns), and a total TMCI bus propagation delay time may be assumed to be 1 ns. Timing parameters of CIMaX™ chip are used to represent the interface circuit 109. Basic timing parameters and sources are listed in Table I as follows:

TABLE I

| Parameter | Value | Description | Source |
|---|---|---|---|
| t1 | 8 ns | Output delay time Tods of channel demod. ckt. | Conventional channel demodulator circuit |
| t2 | 5 ns | Switch over time Tsw of TMCI bus | Assumed |
| t3 | 10 ns | Data set up time Tsu of interface circuit | CIMaX ™ Datasheet page 19 |
| t4 | 10 ns | Data hold time Th of interface circuit | CIMaX ™ Datasheet page 19 |
| t5 | 15 ns | Clock to data delay Tckd of interface circuit | CIMaX ™ Datasheet page 19 |
| t6 | 5 ns | Switch over time Tsw of TMCI bus | Assumed |
| t7 | 10 ns | Data set up time T43 of digital video circuit | Conventional digital video circuit |
| t8 | 0 ns | Data hold time T44 of digital video circuit | Conventional digital video circuit |
| t9 | 10 ns | Input to Output Delay Tiod of interface ckt. | Measured CIMaX ™ device |
| t10 | 5 ns | Switch over time Tsw of TMCI bus | Assumed |

Based on Table I, a minimum time interval (T) in ns required for a full cycle of TMCI bus 106 data flow (not counting a whole cycle delay caused by the interface circuit 109) may be calculated as follows:

$$T = Ta + Tb + Tc + Td + 1 \text{ (ns)}$$

Where,
Ta=Max (t1, t2)=t1=8 ns
Tb=t3+t4=10+10=20 ns
Tc=Max (tc1, tc2)=Max (20, 15)=20 ns
  Where,
  Tc1=t5+t10=15+5=20 ns
  Tc2=t6+Max (t7, t9)=5+Max (10, 10)=15 ns
Td=t8=0 ns
Therefore, $$T = Ta + Tb + Tc + Td + 1 = 8 + 20 + 20 + 0 + 1 = 49 \text{ (ns)}$$

A minimum time interval T of 49 ns may allow the TMCI bus 106 to transfer at a data rate up to approximately 20 Mbps. The 20 Mbps data rate generally provides a time margin of 126% when coupled to a CIMaX™ chip.

As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. A device comprising:
   a demodulator circuit configured to generate (i) a first clock signal compliant with a standard interface for a digital video receiver and (ii) a first plurality of data signals compliant with said standard interface;
   a decoder circuit configured to receive a second plurality of data signals compliant with said standard interface;
   a plurality of first bi-directional buffers configured to multiplex said first data signals with said second data signals at a plurality of data interfaces in response to said first clock signal;
   a circuit configured to generate a direction signal at a direction interface in response to said first clock signal to indicate a direction of said data interfaces; and
   a delay circuit configured to generate a second clock signal compliant with said standard interface by phase shifting said first clock signal.

2. The device according to claim 1, wherein said second data signals are ready to be read at an edge of said second clock signal.

3. The device according to claim 1, wherein said delay circuit is further configured to generate a third clock signal compliant with said standard interface at a clock interface by phase shifting said first clock signal.

4. The device according to claim 3, wherein said first data signals are ready to be read at an edge of said third clock signal.

5. The device according to claim 1, further comprising a second bi-directional buffer configured to multiplex a first valid signal compliant with said standard interface with a second valid signal compliant with said standard interface at a valid interface in response to said first clock signal, said first valid signal indicating when said first data signals are valid and said second valid signal indicating when said second data signals are valid.

6. The device according to claim 5, further comprising a third bi-directional buffer configured to multiplex a first synchronization signal compliant with said standard interface with a second synchronization signal compliant with said standard interface at a synchronization interface in response to said first clock signal, said first synchronization signal indicating a first start of packet for said first data signal and said second synchronization signal indicating a second start of packet for said second data signals.

7. The device according to claim 1, wherein said demodulator circuit is further configured to generate an error signal at an error interface to indicate a demodulation error.

8. The device according to claim 7, further comprising:
wherein said second data signals are ready to be read at an edge of said second clock signal;
a second bi-directional buffer configured to multiplex a first valid signal compliant with said standard interface with a second valid signal compliant with said standard interface at a valid interface in response to said first clock signal, said first valid signal indicating when said first data signals are valid and said second valid signal indicating when said second data signals are valid; and
a third bi-directional buffer configured to multiplex a first synchronization signal compliant with said standard interface with a second synchronization signal compliant with said standard interface at a synchronization interface in response to said first clock signal, said first synchronization signal indicating a first start of packet for said first data signal and said second synchronization signal indicating a second start of packet for said second data signals.

9. The device according to claim 8, wherein said standard interface comprises European Standard reference number EN 50221.

10. A method of transferring data defined by a standard interface for a digital video receiver comprising the steps of:
(A) generating a first clock signal compliant with said standard interface;
(B) multiplexing a first plurality of data signals compliant with said standard interface with a second plurality of data signals compliant with said standard interface at a plurality of data interfaces in response to said first clock signal;
(C) generating a direction signal at a direction interface in response to said first clock signal to indicate a direction of said data interfaces; and
(D) generating a second clock signal compliant with said standard interface in response to chase shifting said first clock signal.

11. The method according to claim 10, wherein said second data signals are ready to be read at an edge of said second clock signal.

12. The method according to claim 10, further comprising the step of generating a third clock signal compliant with said standard interface at a clock interface in response to phase shifting said first clock signal.

13. The method according to claim 12, wherein said first data signals are ready to be read at an edge of said third clock signal.

14. The method according to claim 10, further comprising the step of multiplexing a first valid signal compliant with said standard interface with a second valid signal compliant with said standard interface, said first valid signal indicating when said first data signals are valid and said second valid signal indicating when said second data signals are valid.

15. The method according to claim 14, further comprising the step of multiplexing a first synchronization signal compliant with said standard interface with a second synchronization signal compliant with said standard interface in response to said first clock signal, said first synchronization signal indicating a first start of packet for said first data signal and said second synchronization signal indicating a second start of packet for said second data signals.

16. The method according to claim 10, further comprising the step of generating an error signal at an error interface to indicate a demodulation error.

17. A device comprising:
a demodulator circuit configured to generate (i) a first clock signal compliant with a standard interface for a digital video receiver and (ii) a first plurality of data signals compliant with said standard interface;
a decoder circuit configured to receive a second plurality of data signals compliant with said standard interface;
a plurality of first bi-directional buffers configured to multiplex said first data signals with said second data signals at a plurality of data interfaces in response to said first clock signal; and
a circuit configured to generate a direction signal at a direction interface in response to said first clock signal to indicate a direction of said data interfaces, wherein said demodulator circuit is further configured to generate an error signal at an error interface to indicate a demodulation error.

* * * * *